United States Patent [19]

Morgan et al.

[11] Patent Number: 6,088,799
[45] Date of Patent: Jul. 11, 2000

[54] SECURITY METHOD AND SYSTEM FOR PERSISTENT STORAGE AND COMMUNICATIONS ON COMPUTER NETWORK SYSTEMS AND COMPUTER NETWORK SYSTEMS EMPLOYING THE SAME

[75] Inventors: Stephen P. Morgan, San Jose; Lance W. Russell, Hollister, both of Calif.

[73] Assignee: International Business Machines Corporation, Armonk, N.Y.

[21] Appl. No.: 08/988,880

[22] Filed: Dec. 11, 1997

[51] Int. Cl.⁷ .................................. H04L 9/08; H04L 9/14
[52] U.S. Cl. .......................... 713/182; 713/155; 713/185; 380/279
[58] Field of Search .................................. 713/201, 202, 713/182, 185, 155; 380/279

[56] References Cited

U.S. PATENT DOCUMENTS 5,584,022  12/1996  Kikuchi et al. ........................ 395/609
5,748,735  5/1998  Ganesan ............................... 380/21
5,937,063  8/1999  Davis ................................... 380/4

*Primary Examiner*—Pinchus M. Laufer
*Assistant Examiner*—Jeffrey S. Leaning
*Attorney, Agent, or Firm*—Altera Law Group, LLC

[57] ABSTRACT

A process is described in which a user enters ID and password information at a network client computer terminal. This information is combined with an asymmetric key stored in a persistent storage directly accessible to the client's computer terminal. This "combined" information is communicated through a communication network to one or more server computers for authentication of the client. A similar identification and authentication process may be used to authenticate the server computer. Upon authentication of the client, the server provides the client computer with three symmetric keys, in encrypted format. The first key is for encrypting and decrypting persistent information associated with the client computer's control program. The second key is used to encrypt and decrypt persistent information associated with the login ID. The third key is used to encrypt and decrypt communication between the client computer and the server computer.

18 Claims, 6 Drawing Sheets

Partial Login Request:

| Remote Computer ID | Login ID | Password (KO) | Timestamp |

*Fig. 3*

SECURITY METHOD AND SYSTEM FOR PERSISTENT STORAGE AND COMMUNICATIONS ON COMPUTER NETWORK SYSTEMS AND COMPUTER NETWORK SYSTEMS EMPLOYING THE SAME

CROSS-REFERENCE TO RELATED APPLICATIONS

This application is related to the following co-pending and commonly assigned patent application which is incorporated herein by reference:

Application Ser. No: 08/988,850, entitled "Security Method and System for Persistent Storage and Communications on Computer Network Systems and Computer Network Systems Employing the Same" filed on same date herewith by Stephen P. Morgan and Lance W. Russell, attorney's docket number AM997129.

BACKGROUND OF THE INVENTION

1. Field of the Invention

The present invention relates, generally, to security methods and systems for persistent storage and data communications on computer networks, and computer network systems employing the same.

2. Description of Related Art

Data security has become increasingly more important as modern society and industry becomes more reliant on computer-based transactions and communications. Such transactions and communications often involve the transfer of sensitive, confidential or proprietary data on a computer network system, between multiple user computer terminals or between user terminals and server computers.

Network security measures often involve the storage of such sensitive, confidential or proprietary data in highly secure network server computers, with tight control of access to the server computer database. However, even with such security measures, the inherent operating characteristics of typical network systems can render them susceptible to unauthorized access of data.

In typical network systems, multiple authorized users (or clients) communicate over, and have access to, a common communication network. In many computing applications, data that might be sensitive, confidential or proprietary, must be communicated over the common network, for example, between a server computer and an authorized user (client) computer terminal. As a result, there is a concern that data being communicated to or from a particular authorized network user (client) may be accessed, or even altered, by unauthorized users having access to the same network. Such susceptibility to unauthorized access of data transmissions has resulted in an increased need, in many industries, to maximize network transmission security.

Another potential network security issue involves unauthorized access of data stored in "persistent" storage means at a client terminal (the contents of which persists after the computer terminal is turned off). Some examples of such persistent storage include, but are not limited to, magnetic disk drives, including sealed drives, floppy drives, and removable (cartridge) drives; magneto-optical disk drives; optical disk drives; non-volatile, random access memory (NVRAM); and FLASH read-only memory (ROM). Of course, other means for providing persistent storage exist, and embodiments of the present invention apply to those as well.

In many computing applications, sensitive, confidential or proprietary data must be downloaded (or otherwise entered) in a client's terminal. Indeed, a client might intentionally, or even inadvertently, store such data in a persistent storage means associated with the client's terminal, for example, in the course of running a particular application. This raises a concern that unauthorized persons might gain access to that persistent storage means and the data stored therein, for example, after the client has turned off and left the terminal.

Thus, conventionally, data stored on network computers has often been vulnerable to compromise, as has data being downloaded from server computers to client computers on the network, or being uploaded from client computers to server computers. Moreover, these security concerns have been heightened in contexts in which, for example, networked client terminals were located in areas that were physically less secure than a secure server computer area, or data was transmitted over an unsecure network or a public network such as the Internet.

To minimize the concern about unauthorized access to data stored at network client terminals, some network systems are designed to minimize or eliminate the persistent storage capability at the client terminal. Thus, some network client terminals have been designed with only enough persistent storage capability to store, for example, an operating program for initiating communications with, and downloading further operating software, applications or data from a network server computer. In this regard, network client terminals may be designed to store minimal or no sensitive data, in a persistent storage means.

However, further security issues are raised by network systems in which network client computer terminals with little or no persistent storage means must run an initial control program sufficient to contact one or more servers and request that the servers download programs and/or data to the client computer. When turned on, such client computers load and start their initial control program, which is typically stored within read-only memory (ROM) means. The initial control program is generally capable of initializing and controlling the communication hardware of the client computer terminal, enabling the client terminal to download its regular control program from the server. Although the client computer may attempt to download its regular control program, further security issues arises from the concern that another computer connected to the network may intercept and alter the control program as it is being downloaded, thereby gaining control over the client computer terminal.

If security concerns regarding such persistent storage could be sufficiently minimized, it would be advantageous for network client terminals to be designed to include (or operate with) persistent storage means local to the client terminal. For example, persistent storage may be used to cache control programs for the client computer, thus relieving communication traffic and security risks associated with downloading such control programs from server computers. Persistent storage may be used to cache data downloaded from a server computer, thus relieving communication traffic and security risks associated with downloading of the same data a multiple number of times to the same client terminal. Portable persistent storage may be used to hold control programs and/or data associated with a particular client of a pool of client computers, such as configuration parameters and preferences, or user-private data, that could be carried by the client, from network terminal to network terminal.

Moreover, it would also be advantageous to minimize the above-noted security concerns relating to the transmission of data between client computers and server computers. For example, if such security concerns could be minimized, control programs for network client computers could be simplified, since they would be able to trust data downloaded from server computers. In addition, control programs executed on server computers could be simplified since they would be able to trust data uploaded from client computers. Furthermore, network client and server computers could trust data transmitted over public, unsecure networks such as the Internet.

SUMMARY OF THE DISCLOSURE

It is an object of preferred embodiments of the present invention to minimize the above security problems in a network computing environment.

More particularly, it is an object of preferred embodiments of the present invention to enhance security and performance in a networked computer system in a manner such that a control program downloaded from a server to an authorized user (or client) computer terminal may be protected from alteration by any other computer connected to the network.

It is an object of further preferred embodiments of the present invention to provide the capability to store a control program or data for a client computer terminal on persistent storage directly accessible to the client terminal, but protected from access or alteration by unauthorized users, thus minimizing (or, more preferably, eliminating) the need to download a control program or sensitive data from a server to the client terminal.

It is an object of yet further preferred embodiments of the present invention to provide the capability such that data on persistent storage directly accessible to a client computer terminal may be protected from access or alteration by unauthorized users.

It is an object of yet further preferred embodiments of the present invention to enhance security and performance in a networked computer system such that data communicated between a client computer terminal and a server may be protected from access or alteration by any other computers and/or unauthorized users.

These and other objects may be accomplished, according to communication systems, processes and devices of preferred embodiments of the present invention, in which an authorized user (or client) enters ID and password information at a networked computer terminal. This information is combined with an asymmetric key stored in a persistent storage means directly accessible to the client's computer terminal. This "combined" information is communicated, through a communication link (for example, a public network or a local area network) to one or more server computers for authentication of the client. A similar identification and authentication process may be used to authenticate the server computer.

Upon authentication of the client, the server provides the client computer with three symmetric keys, in encrypted format. The first key is for encrypting and decrypting persistent information associated with the remote (or user's) computer's control program. The second key is used to encrypt and decrypt persistent information associated with the login ID. The third key is used to encrypt and decrypt communication between the client computer and the server computer.

As a result, all communications between the client computer and the server may be encrypted. Moreover, both the client-provided password and the server-provided keys are needed to establish a communication link between a client computer and the server computer. Furthermore, encrypted data and/or operating programs may be stored in persistent storage at the client computer location, while encryption and decryption keys are stored in secure storage associated with the server and provided to a client only after authentication.

BRIEF DESCRIPTION OF THE DRAWINGS

Embodiments of the present invention are described herein with reference to the accompanying drawings, wherein like numerals correspond to like features in the drawings.

FIG. 3 is a block diagram representing a partial login request generated by a client computer on the network system of FIG. 1.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating general principles of the invention. The scope of the invention is best defined by the appended claims.

As noted above, the present invention relates, generally, to security methods and systems for securing persistent storage and data communications for computer networks, and computer network systems employing the same.

Figure 1:
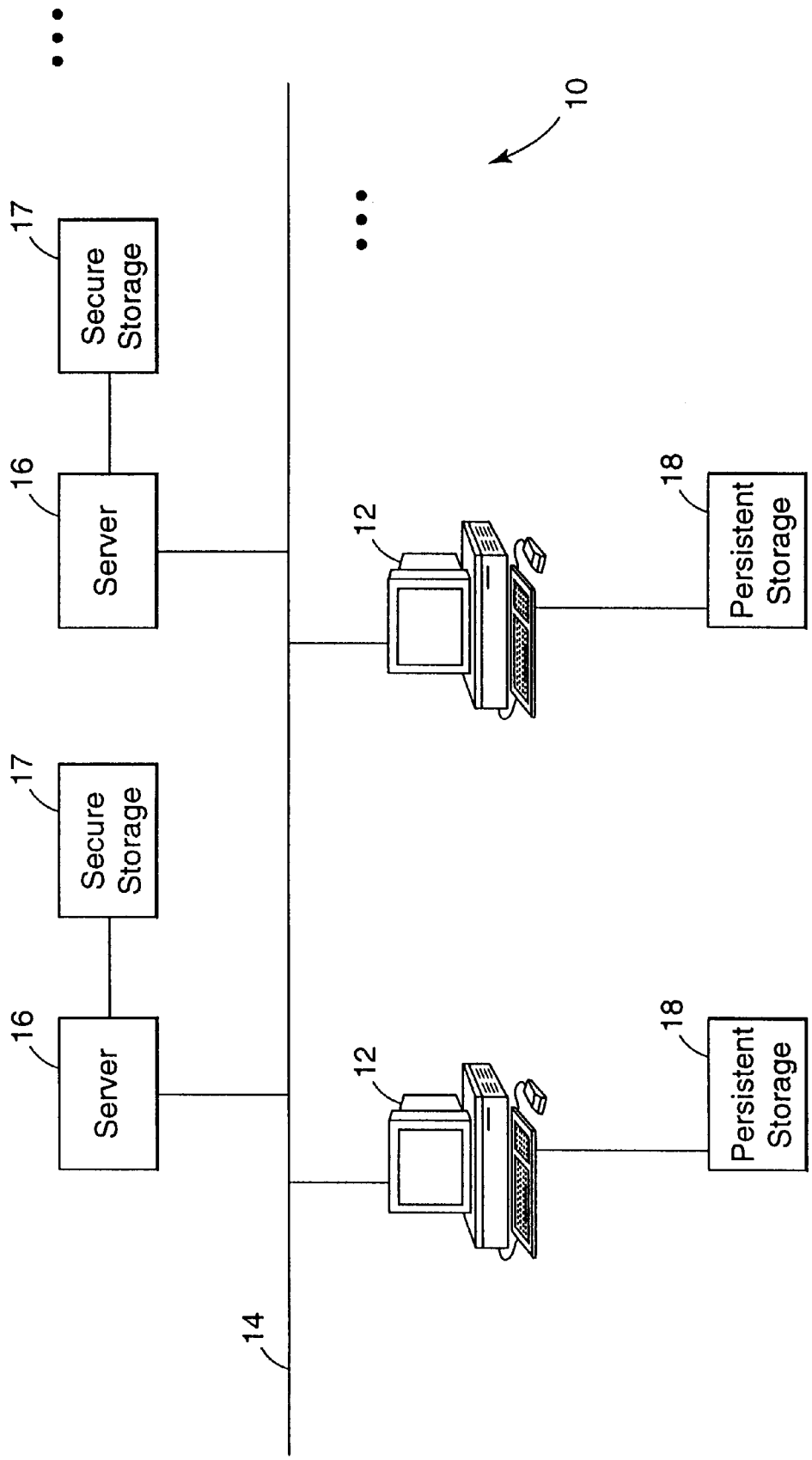
FIG. 1 is a block diagram representing a network system which may be operated in accordance with preferred embodiments of the present invention.

With reference to FIG. 1, a computer network system 10, in accordance with preferred embodiments of the present invention, includes one or more (and preferably a plurality of) client computers 12 operatively connected to a communication link 14. In preferred embodiments, the client computers 12 comprise networked client computer terminals. Two such terminals are shown in FIG. 1. However, it will be understood that network systems according to further embodiments may include more than two client computers 12. Generally, the computer programs which implement the preferred embodiment of the invention may be embodied in or readable from a computer-readable medium or carrier, e.g., one or more of the fixed and/or removable data storage data devices and/or data communications devices connected to the computer. The computer programs comprise instructions which, when read and executed by computer, cause the computer to perform the steps necessary to execute the steps or elements of the present invention.

Preferably, the network also includes one or more (and preferably a plurality of) server computers 16 also operatively connected to the communication link 14. Two such server computers are shown in FIG. 1. However, it will be understood that network systems according to further embodiments may include more than two server computers 16. Each server computer operates with a persistent storage means 17, for example, of the type noted above, but maintained in a secure environment to avoid unauthorized access of data stored therein. The communication link 14 may include a public network, such as the Internet, a local area network, or any other suitable communications connection, hardwired, wireless, or a hybrid thereof.

Also in accordance with preferred embodiments, each client computer 12 operates with, and may directly access, an associated persistent storage means 18 (for example, of the type identified above) and the information stored therein, hereinafter called persistent information. In preferred embodiments as illustrated in FIG. 1, each client computer 12 is directly coupled to an associated persistent storage means 18 local to the client computer. In further embodiments, more than one client terminal may share one or more common persistent storage means.

In preferred embodiments, persistent storage means that are directly accessible to a client computer, are used in conjunction with a communication procedure using asymmetric and symmetric key encryption (as discussed in more detail below), to achieve various advantages related to the above-discussed advantages.

In general, asymmetric key encryption involves two bit strings K1 and K2 and two asymmetric key operators, such as, but not limited to, Rivest-Shamir-Adelman (RSA) asymmetric key operators '+' and '*', applied to an arbitrary bit string A, such that (using the above-noted '+' and '*' operators as an example):

$$(A+K1)*K2=A=(A+K2)*K1.$$

It has been found that the bit stream A is costly to compute solely from knowledge of K1 and/or (A+K1) and/or (A+K2). In addition, it has been found that K2 is costly to compute solely from knowledge of A and/or K1 and/or (A+K1) and/or (A+K2). Two well-known examples of asymmetric key encryption which may be employed with preferred embodiments of the present invention are Diffie-Hellman (DH) and RSA. However, further embodiments of the present invention may employ other asymmetric key encryption techniques and asymmetric key operators consistent therewith.

Symmetric key encryption generally involves a bit string K and a symmetric key encryption operator, such as, but not limited to, the U.S. Data Encryption Standard (DES) operator '&', applied to an arbitrary bit string A, such that (using the above-noted '&' operator as an example):

$$(A\&K)\&K=A.$$

It has been found that A is costly to compute solely from knowledge of (A & K). It has also been found that K is costly to compute solely from knowledge of (A & K). One well-known example of key symmetric key encryption which may be employed with preferred embodiments of the present invention is the DES. However, further embodiments of the present invention may employ other symmetric key encryption techniques and symmetric key operators consistent therewith.

In accordance with preferred embodiments of the present invention, to initiate communications between a client computer and a server computer on a network, a security operation is carried out using both asymmetric and symmetric key encryption techniques. A preferred embodiment of such an operation is described below with reference to FIGS. 2–5, in terms of processes carried out by the client computer and the server computer during the initiation of a communication protocol between those computers. While the preferred embodiments described in connection with the examples below employ the above-noted RSA asymmetric key operators and DES symmetric key operators, it will be understood that further embodiments may employ other asymmetric key and symmetric key operators consistent with other asymmetric and symmetric key encryption techniques.

As described in more detail below, the procedure may be initiated at the client computer 12, for example, upon a client entering an ID and password at the client computer terminal, preferably by manual entry through a suitable input means, such as a keyboard, card-reader, touch-screen, mouse or other suitable user-operated input device. However, further embodiments are contemplated in which identification and/or password information is automatically generated or recalled from a storage medium at the client computer.

The password is preferably encrypted at the client computer 12 with a first symmetric key K0 for further security. Key K0 may be stored, for example, in persistent storage means 18, directly accessible to the client computer 12. The ID and encrypted password are then combined with a timestamp generated by the computer 12. This "combined" information is then encrypted with a first asymmetric key K1 and communicated, through the communication network 14 (for example, through an internet link or a local area network link) to one or more server computers 16. The server computer(s) then use the information to authenticate the transmitting client computer. An authentication procedure may also be carried out to authenticate the server computer to the client computer.

Upon authentication of the client computer, the server computer provides the client computer with three symmetric keys. One of those three keys is for encrypting and decrypting persistent information associated with the client computer's control program. Another one of those three keys is used to encrypt and decrypt persistent information associated with the login ID. Yet another one of those three keys is used to encrypt and decrypt communication between the client computer and the server computer.

Figure 2:
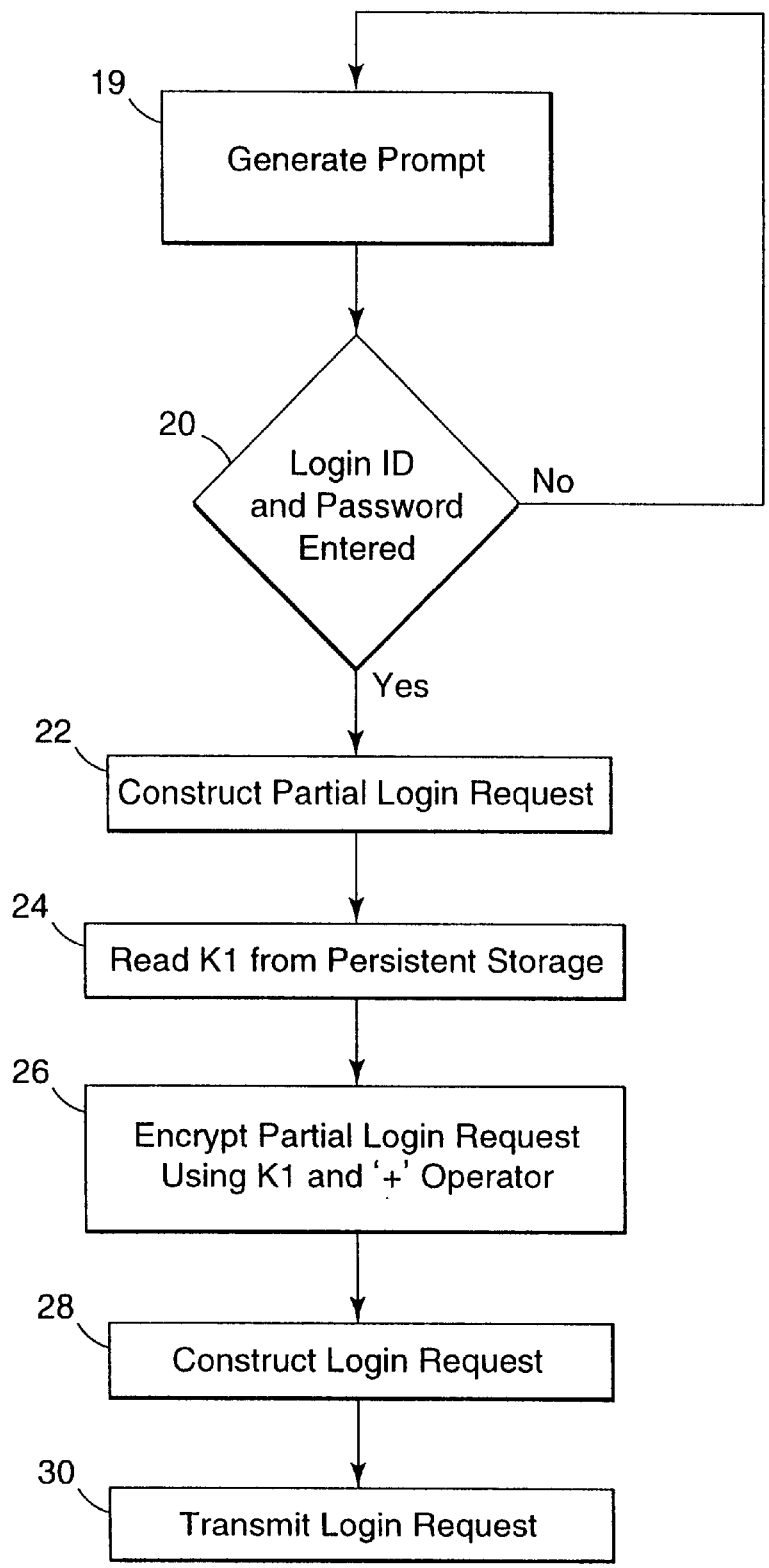
FIG. 2 is a flow chart representing an initial portion of a login process carried out by an authorized user (or client) computer on the network system of FIG. 1.
Figure 4A:
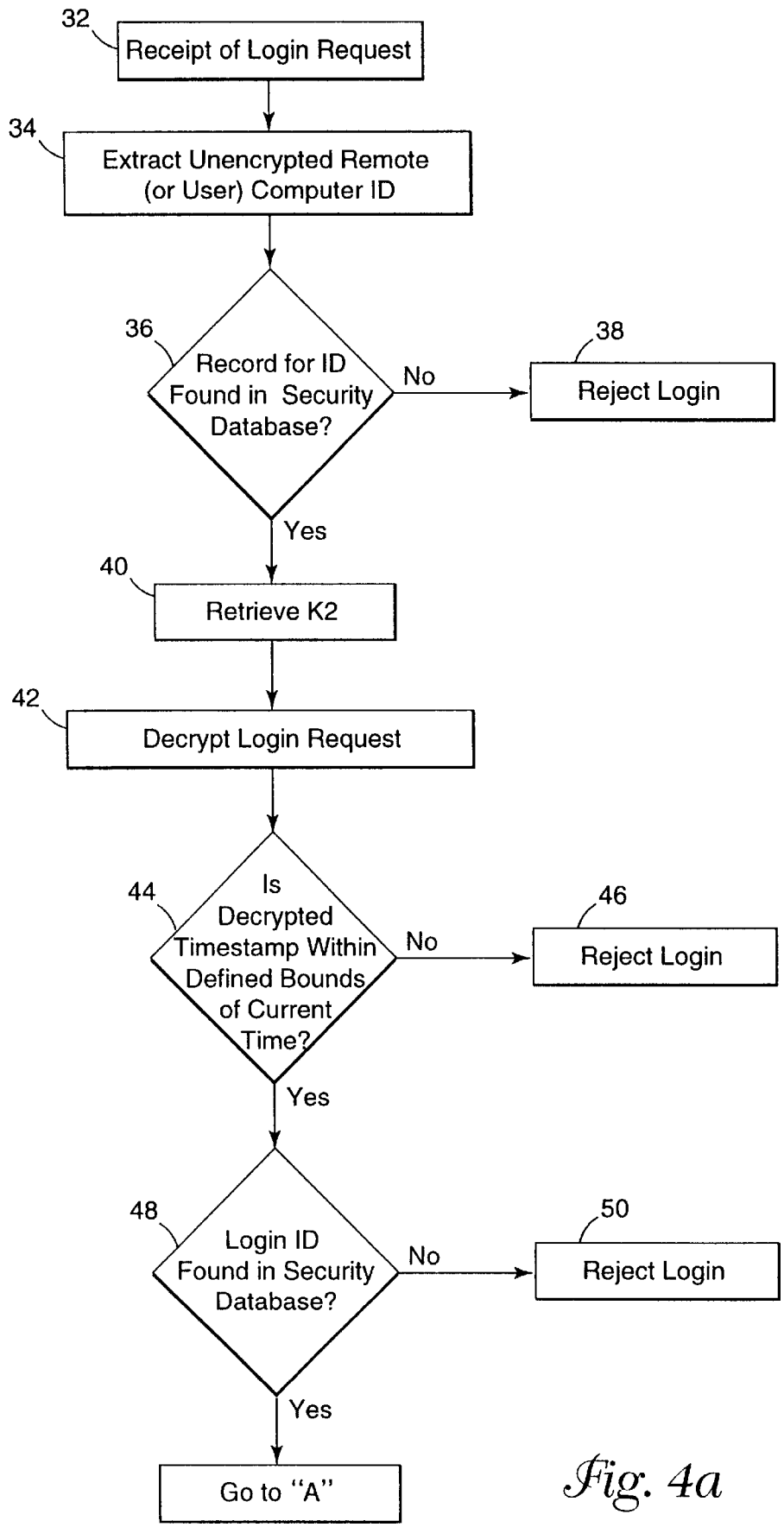
FIGS. 4a and 4b show a flow chart representing a portion of a login process carried out by a server computer on the network system of FIG. 1.
Figure 4B:
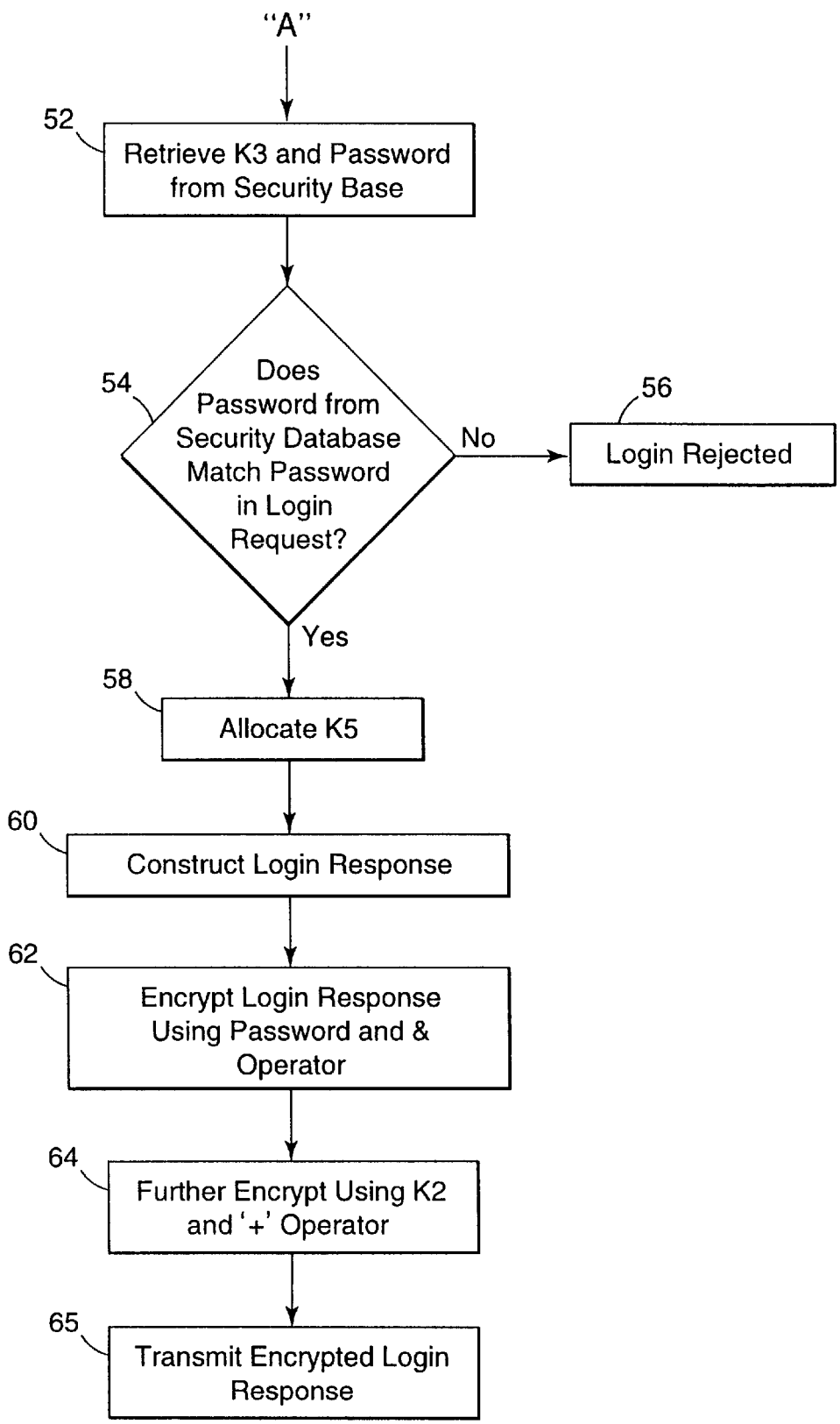
Figure 5:
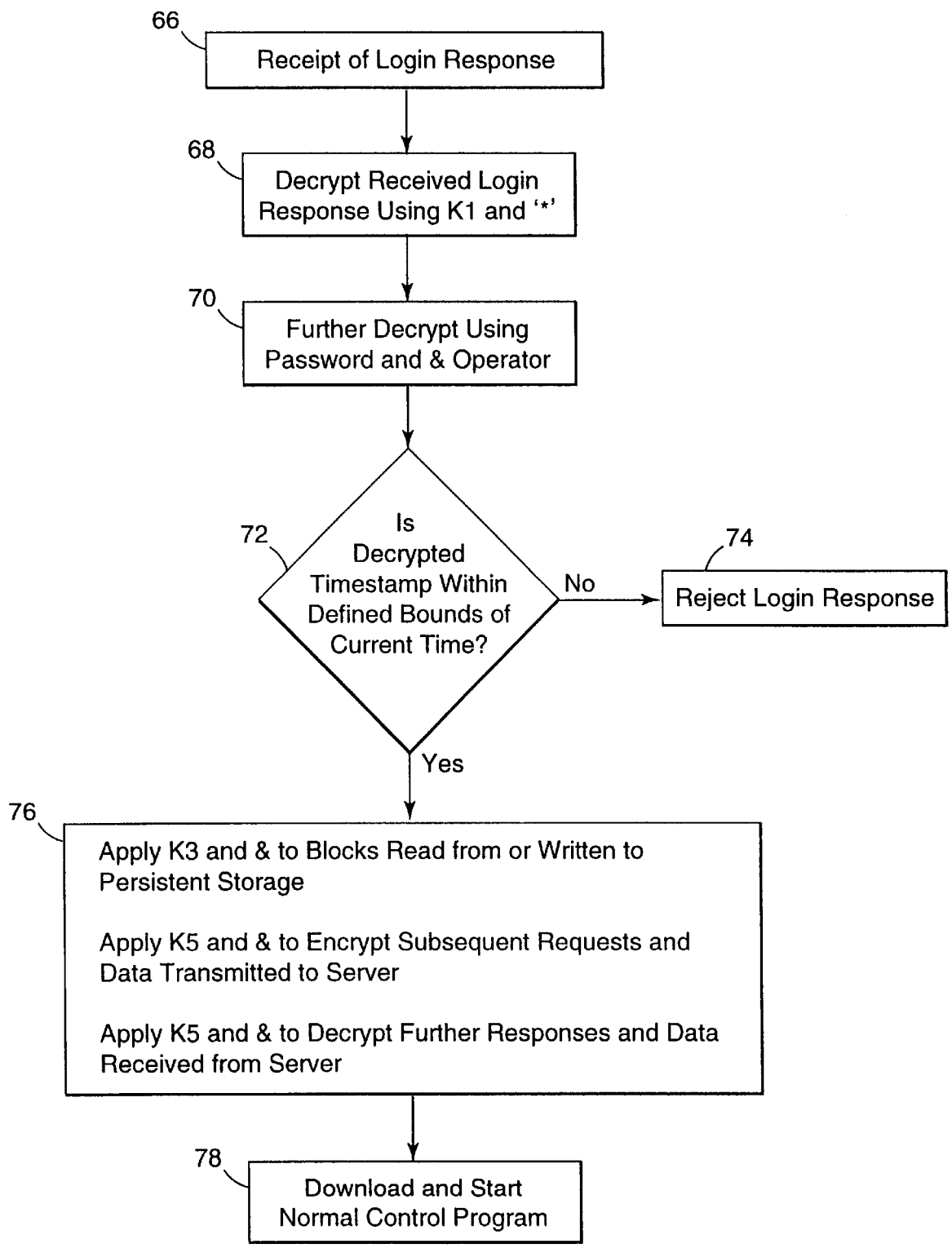
FIG. 5 is a flow chart representing a further portion of a login process carried out by a client computer on the network system of FIG. 1.

A preferred embodiment of this process is described in more detail, first with reference to the initiation portion of the process carried out by the client computer (as represented in FIG. 2), then with reference to the response portion of the process as carried out by the server computer (as represented in FIGS. 4a and 4b) and, then, with reference to the response portion of the process, as carried out by the client computer (as represented in FIG. 5).

Initiation at the Client Computer

In accordance with the preferred embodiment represented by FIGS. 2–4, communication between an authorized user (or client) computer and a server computer is initiated at the client computer. Further embodiments are contemplated in which the server or another computer initiates the process, for example, by transmitting a poll signal, request or demand to one or more client computers.

However, in accordance with the embodiment illustrated in FIG. 2, each client computer 12 is controlled by an initial login control program to wait for an authorized user (or client) to enter a login ID and password (step 20) to initiate the process. While a remote computer waits for such input, a prompt (such as a visual or audible signal requesting the client to enter such data) is preferably generated at the client computer terminal (step 19 in FIG. 2). If the client computer supports multiple simultaneous logins, each is prompted for a login ID and password.

Upon a client entering a login ID and password at a particular remote computer 12, the login control program controls the client computer to construct a "partial login request" (step 22 in FIG. 2). The partial login request, as shown in FIG. 3, is composed of the client computer's ID (for example, previously stored in the persistent storage 18), the login ID, the client password (encoded with a first symmetric key K0), and a timestamp.

Upon constructing the partial login request (or, alternatively, prior thereto or simultaneously therewith), the login control program controls the client computer 12 to read the first asymmetric key K1 from its associated persistent storage device 18 (step 24 in FIG. 2). The partial login request is then encrypted with the retrieved first asymmetric key K1 and a first asymmetric key encryption operator, such as the '+' operator (step 26 in FIG. 2), and forms a login request composed of a concatenation of the client computer's ID (unencrypted) with the encrypted partial login request (step 28 in FIG. 2). The completed login request is then transmitted, via the network communication link 14, to a server computer 16 (step 30 in FIG. 2).

Response by the Server

Upon receipt of the complete login request (step 32 in FIG. 4a), a server control program operates the server computer to extract the (unencrypted) client computer's ID field from the received login request (step 34 in FIG. 4a) and examine a security database for a record associated with the client computer's ID (step 36 in FIG. 4a). The security database may be, for example, a databank stored on the secure storage device 17 associated with the server or may be a secure database accessible by the server by other means, such as a secure network link or the like.

If, upon examination of the security database, a record associated with the client computer's ID is not found, the login request is considered a forgery and is rejected by the server computer (step 38 in FIG. 4a). If a record is found, then the record, which comprises, for example, a single field containing a second asymmetric key K2, is retrieved from the security database (step 40 in FIG. 4a), wherein the second asymmetric key K2 relates to the first asymmetric key K1 such that:

$$(A+K1)*K2=A=(A+K2)*K1$$

wherein '+' and '*' are first and second asymmetric key encryption operators.

The control program then operates the server to decrypt the K1 encrypted fields of the login request, using the second asymmetric key K2 along with the second asymmetric key operator '*', to yield the login ID and password (symmetric key K0 encrypted), and the timestamp (step 42 in FIG. 4a). The server computer is then operated to compare the current time with the decrypted timestamp (step 44 in FIG. 4a). If the difference between the current time and the timestamp are not within predefined bounds, the login request is considered a forgery, and is rejected by the server computer (step 46 in FIG. 4a).

In addition, the server is operated to examine the security database for a record associated with the login ID (step 48 in FIG. 4a). If a record is not found, the login request is considered a forgery and is rejected by the server computer (step 50 in FIG. 4a). If a record is found, then the record, which comprises a field containing a second symmetric key K3 and a field containing a password (symmetric key K0 encoded) associated with the login ID, is retrieved (step 52 in FIG. 4b).

The retrieved password (symmetric key K0 encoded) is then compared with the password (symmetric key K0 encoded) received with the login request (step 54 in FIG. 4b). Alternatively, the security database record may include first symmetric key K0 with an unencrypted password, such that the password received from the client computer may be decrypted by the server and then compared, in its decrypted form, to the unencrypted password received from the client computer. If these do not match, the login request is considered a forgery, and is rejected by the server computer (step 56 in FIG. 4b). On the other hand, if a sufficient match is detected, then a third symmetric key K5 is allocated at the server computer for communication between the server computer and the client computer (step 58 in FIG. 4b). A login response is then constructed (step 60 in FIG. 4b), wherein the login response comprises second and third symmetric keys K3, and K5 (and, in further preferred embodiments, a fourth symmetric key K4) and a timestamp.

The server computer is operated to encrypt the login response twice: first, using the password and a symmetric key encryption operator, such as the '&' operator (step 62 in FIG. 4b), and second, using the second asymmetric key K2 and the first asymmetric key encryption operator '+' (step 64 in FIG. 4b). The resulting twice-encrypted login response is then transmitted, via the communication network 14, to the client computer that initiated the process (step 65 in FIG. 4b).

Response by the Client Computer

Upon receipt of the login response (step 66 in FIG. 5), the initial control program running at the remote (or user) computer operates that computer to decrypt the login response twice, first, using the first asymmetric key K1 and the second asymmetric key encryption operator '*' (step 68 in FIG. 5), and second, using the password and the symmetric key encryption operator '&' (step 70 in FIG. 5).

The timestamp as decrypted from the login response is then compared with the current time (step 72 in FIG. 5). If the difference between the timestamp and the current time are not within predefined bounds, the login response is considered a forgery, and is rejected by the client computer (step 74 in FIG. 5). On the other hand, if the time difference is within the predefined bounds, then the client computer is operated as follows:

(a) Apply the second symmetric key K3 from the login response along with the symmetric key encryption operator '&', to any blocks it reads from or writes to persistent storage device 18. If the second and fourth symmetric keys K3 and K4 are included in the login response, then the second symmetric key K3 may be used to encrypt and decrypt persistent information associated with the client computer's control program, while the fourth symmetric key K4 may be used to encrypt or decrypt persistent information associated with a particular client, as recognized from the login ID.

(b) Use the third symmetric key K5 and the symmetric key encryption operator '&' to encrypt all subsequent requests and data it transmits to the server computer (while the control program running at the server computer uses this same key and operator to decrypt these requests and data).

(c) Use the third symmetric key K5 and the symmetric key encryption operator '&' to decrypt any responses and data it receives from the server computer (while the control program running at the server computer uses this same key and operator to encrypt these responses and data).

In addition, the client computer downloads and starts the client computer's normal control program (steps 76 and 78 in FIG. 5). In some preferred embodiment, the client computer's normal control program is stored in secure storage associated with the server computer, and is downloaded to the client computer only upon a successful completion of the login and authentication procedures. In other preferred embodiments, the client computer's normal control program is stored, in encrypted format, in the persistent storage device 18 associated with the client computer, the key for which is provided to the client computer only upon a successful completion of the login and authentication procedures.

In accordance with such preferred embodiments, the persistent storage device 18 (FIG. 1) associated with each client computer 12, comprises a pool of read-write storage blocks, preferably of identical capacity. One such block is designated the "security block," and contains the first asymmetric key K1 (unencrypted). All other persistent storage blocks in the pool contain data encrypted with a symmetric key, such that: (1) blocks associated with a given login ID may be encrypted and decrypted with the login ID's symmetric key; and (2) blocks associated with the remote (or user) computer's control program may be encrypted and decrypted with the client computer's symmetric key.

Pursuant to the above-discussed process, significant advantages are achievable, with respect to security issues relating to persistent storage at the client computers. More specifically, encrypted persistent information remains encrypted when the client computer is off, or when the persistent storage containing said persistent information is removed from the client computer.

Thus, client computers may be provided with (and directly access) persistent storage devices, with confidence in the security of storing data and/or control programs for the client computer on the persistent storage, in that the data and control programs may be encrypted and, thus, protected from access or alteration by unauthorized users. Thus, sensitive data may be stored on persistent storage for direct access by the client computer, minimizing the need to download such data over the network from a server. In addition, the client computer need not download a control program from a server.

Alternatively, in accordance with further preferred embodiments, once login procedures are carried out, the client computers may load further control programs or data from secure persistent storage and/or secure communication networks associated with the server with which login took place. Thus, the security controls associated with the login and authentication procedures provide confidence that the control programs or data downloaded from the server are correct and secure.

In addition, significant advantages are achievable with respect to security issues relating to the transmission of sensitive information over a network communication link, in that all communications between the client computer and the server computer are encrypted. In this manner, data communicated between a client computer and a server may be protected from access or alteration by any other computers and/or unauthorized users. Furthermore, knowledge of the password alone is insufficient to access persistent information unless the persistent storage containing said persistent information is also directly accessible to a client computer that is connected by a communication network to a server computer.

In further preferred embodiments, security may be enhanced by programming the client computer and/or server computer to reject communication key K5 after a fixed time, or after a certain number of accesses to secure data, or when certain highly sensitive or secret data is to be accessed, forcing the client computer and server computer to reauthenticate.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A login method to enhance security in a network computer system having at least one server computer coupled over a communication network to a plurality of client computers, wherein each client computer is coupled to directly access a persistent storage device and wherein each client computer is operated by a control program after login, the method comprising the steps of:

receiving a login ID and password from a user at a first one of said client computers;

encrypting the login ID and password with a first asymmetric key stored in the persistent storage coupled to the first client computer;

transmitting a login request including the encrypted login ID and password to a first one of said server computers;

decrypting the encrypted portions of the login request with a second asymmetric key at the server computer;

authenticating the first client computer to the first server computer, using the login ID and password from the decrypted login request;

transmitting, upon authentication of the first client computer, a set of symmetric keys from the first server computer to the first client computer, including:

one symmetric key for encrypting and decrypting persistent information associated with the control program for operating the first client computer;

another symmetric key for encrypting and decrypting persistent information associated with the login ID; and yet another symmetric key for encrypting and decrypting communications between the first client computer and the first server computer.

2. A method to enhance security in a network computer system having at least one server computer coupled over a communication network to at least one client computer, wherein each client computer is coupled to directly access a persistent storage device and wherein each client computer is operated by a control program after login, the method comprising the steps of:

receiving a login ID and password from a user at a first one of said client computers;

encrypting the login ID and password using a first asymmetric key stored in the persistent storage coupled to the first client computer;

forming a login request including the encrypted login ID and password;

transmitting the login request to a first one of said server computers;

decrypting the encrypted portions of the login request with a second asymmetric key at the server computer;

authenticating the first client computer to the first server computer, using the login ID and password from the decrypted login request;

transmitting, upon authentication of the first client computer at least three symmetric keys from the first server computer to the first client computer;

encrypting and decrypting persistent information associated with the control program for operating the first client computer, using one of the at least three symmetric keys transmitted by the server computer;

encrypting and decrypting persistent information associated with the login ID using another one of the at least three symmetric keys transmitted by the server computer; and encrypting and decrypting further communications between the client computer and the server computer using yet another one of the at least three symmetric keys transmitted by the server computer.

3. A method as recited in claim 2, wherein the step of encrypting the login ID and password using a first asymmetric key stored in the persistent storage, comprises the steps of:

retrieving a first asymmetric key K1 from the persistent storage device coupled to the first remote computer; and encrypting the login ID and password using the K1 key and a first asymmetric key encryption operator to provide: (A+K1);

wherein '+' represents the first asymmetric key encryption operator and 'A' represents the information constituting the login ID and password.

4. A method as recited in claim 3, wherein the step of decrypting the encrypted portions of the login request at the server comprises the steps of:

retrieving a second asymmetric key K2 from a secure storage accessible to the server; and applying the K2 key and a second asymmetric key encryption operator to the encrypted portions of the login request, wherein '*' represents the second asymmetric key encryption operator; and wherein (A+K1)*K2=A=(A+K2)*K1.

5. A method as recited in claim 4, wherein the step of forming a login request further comprises combining an unencrypted ID code specific to the first client computer with the encrypted portions of the login request, and wherein said step of retrieving a second asymmetric key K2 comprises the steps of:

extracting the unencrypted remote computer ID code from the received login request;

searching a security database for a record corresponding to the extracted ID code, wherein said record contains the second asymmetric key K2 associated with the ID code; and retrieving key K2 from the security database, upon locating a record corresponding to the extracted ID code in the security database.

6. A method as recited in claim 4, wherein said step of authenticating the first client computer to the first server computer, comprises the steps of searching a security database for a record corresponding to the login ID, wherein said record contains a second symmetric key K3 and a password corresponding to the login ID;

comparing the password from the security database record with the password of the login request;

rejecting the login request upon an insufficient correspondence between the compared passwords;

allocating a third symmetric key K5 for further communications with the first remote computer upon a sufficient correspondence between the compared passwords;

constructing a login response comprising second, third and fourth symmetric keys K3, K4 and K5 encrypting the login response; and transmitting the encrypted login response to the first remote computer.

7. A method as recited in claim 6, wherein said step of encrypting the login response comprises the steps of first, encrypting the login response using the password and a symmetric key encryption operator and then encrypting the resulting encryption using the second asymmetric key K2 and the first asymmetric encryption key operator.

8. A method as recited in claim 2, wherein said step of authenticating the first remote computer to the first server computer, comprises the steps of:

searching a security database for a record corresponding to the login ID, wherein said record contains a symmetric key and a password corresponding to the login ID;

comparing the password from the security database record with the password of the login request;

rejecting the login request upon an insufficient correspondence between the compared passwords;

allocating a symmetric key K5 for further communications with the first remote computer upon a sufficient correspondence between the compared passwords;

constructing a login response comprising three symmetric keys, including the symmetric key in the security database record corresponding to the login ID and two other symmetric keys;

encrypting the login response using the password and a symmetric encryption key operator and then encrypting the resulting encryption using an asymmetric key and a first asymmetric key encryption operator; and transmitting the encrypted login response to the first client computer.

9. A computer network system having enhanced security, comprising:

a communications network;

at least one server computer coupled for communication over the communication network;

a plurality of client computers, each coupled for communication over the communication network and each operated by a control program after login;

a persistent storage device associated with each client computer, for storing persistent information directly accessible by the associated client computer;

an input device associated with each client computer for receiving a login ID and password from a user;

means associated with each client computer, for encrypting the login ID and password received by the input device, with a first asymmetric key stored in the associated persistent storage;

means associated with each client computer for constructing and transmitting a login request including the encrypted login ID and password, over the communications network, to at least one of said server computers;

means associated with said at least one server computer, for receiving said login request and decrypting the encrypted portions of the login request with a second asymmetric key;

means associated with said at least one server computer for authenticating the first client computer, using the login ID and password from the decrypted portions of the login request;

means associated with said at least one server, for transmitting, upon authentication of the first client computer, a set of symmetric keys to the first client computer, including:

at least one symmetric key for encrypting and decrypting persistent information associated with the control program for operating the first client computer;

at least one other symmetric key for encrypting and decrypting persistent information associated with the login ID; and at least one further symmetric key for encrypting and decrypting communications between the first client computer and the first server computer.

10. A system as recited in claim 9, further comprising means associated with the first client computer for encrypting and decrypting persistent information associated with the control program for operating the first client computer, using at least one of the symmetric keys transmitted by said server computer.

11. A system as recited in claim 9, further comprising means associated with the first client computer for encrypting and decrypting persistent information associated with the login ID using at least one of said other symmetric keys transmitted by said server computer.

12. A system as recited in claim 9, further comprising means associated with the first client computer and said server computer for encrypting and decrypting further communications between the client computer and the server computer using at least one of said further symmetric keys transmitted by the server computer.

13. A system as recited in claim 9, wherein said means for encrypting the login ID and password, comprises:

means for retrieving a first asymmetric key K1 from the persistent storage device associated with the first client computer; and means for encrypting the login ID and password using the first asymmetric key K1 and a first asymmetric key encryption operator to provide (A+K1);

wherein '+' represents the first asymmetric key encryption operator and wherein A represents the information constituting the login ID and password.

14. A system as recited in claim 13, wherein:

said at least one server is operable with a secure storage, for retrieving records from the secure storage;

said means for decrypting the encrypted portions of the login request comprise means for retrieving a second asymmetric key from the secure storage and applying the second asymmetric key and a second asymmetric key encryption operator to the encrypted portions of the login request, such that: (A+K1)*K2=A=(A+K2)*K1; and K2 represents the second asymmetric key and '*' represents the second asymmetric key encryption operator.

15. A method as recited in claim 14, wherein said means for authenticating the first client computer to said server computer, comprise:

means associated with said server computer for searching said secure storage for a record corresponding to the login ID, wherein said record contains a second symmetric key K3 and a password corresponding to the login ID;

means for comparing the password from the security database record with the password of the login request and for rejecting the login request upon an insufficient correspondence between the compared passwords;

means for constructing a login response comprising at least three symmetric keys K3, K4 and K5 upon a sufficient correspondence between the compared passwords; and means for encrypting the login response and providing the encrypted login response to said means for transmitting.

16. A method as recited in claim 15, wherein said means for encrypting the login response comprises means for first encrypting the login response using the password and a symmetric key encryption operator, and then encrypting the resulting encryption using the second asymmetric key encryption operator K2 key and the second asymmetric key encryption operator '+'.

17. A system as recited in claim 9, wherein said means for constructing a login request comprises comprise means for combining an unencrypted ID code specific to the first client computer with the encrypted portions of the login request, and wherein said means for retrieving a second asymmetric key comprises:

means for extracting the unencrypted remote computer ID code from the received login request;

means for searching a security database for a record corresponding to the extracted ID code, wherein said record contains the second asymmetric key associated with the ID code; and means for retrieving the second asymmetric key from the security database, upon locating a record corresponding to the extracted ID code in the security database.

18. An article of manufacture comprising a computer program carrier readable by a first client computer coupled to a computer network system having a plurality of client computers and at least one server computer, the computer program carrier embodying one or more instructions executable by the first remote computer to perform method steps of:

receiving a login ID and password from a user at a first one of said client computers;

encrypting the login ID and password using an asymmetric key stored in the persistent storage coupled to the first client computer;

forming a login request including the encrypted login ID and password;

transmitting the login request to a first one of said server computers;

decrypting the encrypted portions of the login request with a first asymmetric key at the server computer;

authenticating the first client computer to the first server computer, using the login ID and password from the decrypted login request;

transmitting, upon authentication of the first client computer a set of symmetric keys from the first server computer to the first client computer;

encrypting and decrypting persistent information associated with the control program for operating the first remote computer, using at least one of the symmetric keys transmitted by the server computer;

encrypting and decrypting persistent information associated with the login ID using another one of the symmetric key transmitted by the server computer; and encrypting and decrypting further communications between the client computer and the server computer using at least one further symmetric key transmitted by the server computer.

* * * * *